United States Patent
Hebb et al.

(10) Patent No.: US 6,320,864 B1
(45) Date of Patent: *Nov. 20, 2001

(54) LOGICAL MULTICASTING METHOD AND APPARATUS

(75) Inventors: Andrew T. Hebb, Hudson; Gregory S. Goss, Lowell, both of MA (US)

(73) Assignee: Ascend Communications, Inc., Westford, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,584

(22) Filed: Jun. 19, 1998

(51) Int. Cl.[7] .............................. H04L 12/28; H04L 12/56

(52) U.S. Cl. ............................................. 370/412; 370/417

(58) Field of Search .................................... 370/395, 412, 370/417, 418, 419, 422, 428, 429, 398, 399, 229, 230, 237, 389, 392, 432

(56) References Cited

U.S. PATENT DOCUMENTS

| | | |
|---|---|---|
| 5,179,556 | 1/1993 | Turner . |
| 5,202,885 | 4/1993 | Schrodi et al. . |
| 5,229,991 | 7/1993 | Turner . |
| 5,301,055 | 4/1994 | Bagchi et al. ............ 359/139 |
| 5,305,311 | 4/1994 | Lyles . |
| 5,402,415 | 3/1995 | Turner . |
| 5,410,540 | 4/1995 | Aiki et al. . |
| 5,434,855 | 7/1995 | Perlman et al. . |
| 5,436,893 | 7/1995 | Barnett . |
| 5,497,369 | 3/1996 | Wainwright . |

(List continued on next page.)

OTHER PUBLICATIONS

Rob Coltun, et al., PRP: A P–NNI Routing Protocol Proposal, ATM Forum Technical Committee, ATM_Forum/ 94–0492, May 1994.

Douglas H. Hunt, et al., Credit–Based FCVC Proposal for ATM Traffic Management (Revision R1), ATM Forum Technical Committee Traffic Management Subworking Group, ATM Forum/94–0168R1, May 1994.

Douglas H. Hunt, Action Item Status for Credit–Based FCVC Proposal, ATM Forum Technical Committee Traffic Management Subwork Group, ATM_Forum/94–0439, May 1994.

H.T. Kung, et al., Credit–Based Flow Control for ATM Networks; Credit Update Protocol, Adaptive Credit Allocation and Statistical Multiplexing, Proceedings of ACM SIGCOMM '94 Symposium on Communications Architectures, Protocols and Applications, Apr. 1995.

*Primary Examiner*—Ajit Patel
(74) *Attorney, Agent, or Firm*—Weingarten, Schurgin. Gagnebin & Hayes LLP

(57) ABSTRACT

A method and apparatus for performing logical multicasting within a network switch are disclosed so as to permit a downstream network device to perform cell forwarding in a manner which resembles spatial multicasting. A logical multicast cell has a connection identifier associated with the cell within the switch. The connection identifier is employed to initiate a series of lookup operations to generate unique VPI/VCI addresses which are transmitted out of an output port of the switch as copies or leaves of the multicast cell. Successive look-ups of outgoing VPI/VCI addresses for a logical multicast cell are performed using a chain bit to indicate when all leaves of the cell have been transmitted. Leaves of a logical multicast cell are transmitted to the downstream network device from one output cell buffer of a plurality of output cell buffers associated with the output port of the switch so as to minimize the likelihood of blocking and so as to minimize cell delay variation. In one embodiment, the output cell buffers having cells to transmit are afforded transmit opportunities in a round robin sequence.

19 Claims, 4 Drawing Sheets

U.S. PATENT DOCUMENTS

| | | |
|---|---|---|
| 5,528,588 | 6/1996 | Bennett et al. . |
| 5,572,522 | 11/1996 | Calamvokis et al. . |
| 5,577,035 * | 11/1996 | Hayter et al. .......................... 370/412 |
| 5,583,861 * | 12/1996 | Holden ................................ 370/395 |
| 5,592,476 | 1/1997 | Calamvokis et al. . |
| 5,689,506 * | 11/1997 | Chiussi et al. ....................... 370/388 |
| 5,790,522 * | 8/1998 | Fichou et al. ........................ 370/236 |
| 5,859,835 * | 1/1999 | Varma et al. ........................ 370/229 |

* cited by examiner

LOGICAL MULTICASTING METHOD AND APPARATUS

CROSS REFERENCE TO RELATED APPLICATIONS

NOT APPLICABLE

STATEMENT REGARDING FEDERALLY SPONSORED RESEARCH OR DEVELOPMENT

NOT APPLICABLE

BACKGROUND OF THE INVENTION

The present invention relates to computer networking and more particularly to a method and apparatus for performing logical multicasting in a computer network.

Telecommunications networks deliver data by routing data units, such as Asynchronous Transfer Mode ("ATM") cells, from source to destination through switches. Each switch includes input/output ("I/O") ports through which the ATM cells are received and transmitted, respectively. The switch determines the appropriate output port to be employed for transmission of the cell based upon an address in the received cell header, such as the VPI/VCI address within the cell header of a received ATM cell.

Depending on the destination indicated in the cell header, it may be desirable to transmit the cell from multiple ports on the switch. Cells which enter a switch through one port and exit through one port are referred to as unicast cells. Cells which enter the switch through a single port and exit through multiple ports are known as multicast cells. While most existing switches are configured to handle unicast cells, not all switches are capable of multicast operation.

Two types of multicasting are known in the art; namely spatial multicasting and logical multicasting. Spatial multicasting involves the receipt of a cell at one input port of a network switch and the forwarding of copies of the cell out of plural output ports of the network switch. Each copy of the cell which is forwarded out of an output port in a spatial multicasting operation is provided with a unique VPI/VCI address. Logical multicasting involves the receipt of a cell at an input port of a network switch and the forwarding of plural copies of the cell out of a single output port of the network switch. Each of the leaves of the logical multicast cell is transmitted from the output port with a unique VPI/VCI address.

While many switches are capable of spatial multicast operation (transmission of single copies of a cell through multiple output ports), not all multicast switches are capable of logical multicast operation (transmission of multiple copies of a cell through a single output port). Logical multicast switches are known, but are more complex and costly than typical spatial-only multicast switches.

One technique for performing logical multicast of cells within a network switch is disclosed in U.S. patent application Ser. No. 08/710,673 filed Sep. 18, 1996 and assigned to the predecessor in interest of the present application. Tile technique therein disclosed provides a first copy of the cell to the desired output port. A second copy of the cell is provided to a dedicated loop back output port which causes the cell to be looped back to an input port dedicated to loop back. The cell provided to the loop-back input port is subsequently directed to the desired output port such that the first and second copies of the cell are serially transmitted from the single desired output port. The cell may be repeatedly provided to the loop-back port to permit the cell to be transmitted in a serial fashion from the desired output as many times as desired. This technique disadvantageously requires the dedication of one input port and one output port to the logical multicasting function.

Accordingly, it would be desirable to be able to handle logical multicast operation without specifically allocating input or output ports for the support of multicast operation. Additionally, it would be useful to provide multicast type capability in switches which do not support multicast operation by design.

BRIEF SUMMARY OF THE INVENTION

A method and apparatus for performing logical multicasting in a first network device are disclosed so as to permit a downstream network device to forward cells in a manner which resembles spatial multicasting. A multicast cell which is received at a network switch is converted into a plurality of cells, each having a unique VPI/VCI address. The cells are then transmitted out of a single physical port to a downstream network node. The downstream node can then switch the cells out of different physical output ports based upon the received incoming VPI/VCI addresses transmitted by the upstream node.

More specifically, an internal cell header is prepended to an ATM multicast cell within the input port prior to forwarding the cell to the output port from which the logical multicast is to occur. The internal cell header includes a multicast identifier (MID) which is converted to a local connection identifier (CID) via a table look up within the respective output port. The local connection identifier serves as an offset value. The multicast cell is stored in one of a plurality of queues within the respective output port along with the internal cell header.

The multicast cell is retrieved from the respective queue based upon a scheduling algorithm which may employ strict priority scheduling algorithm, a weighted priority scheduling algorithm or any other suitable scheduling technique. When the multicast cell is retrieved from the respective queue, it is placed in one of a plurality of Output Cell Buffers associated with the respective output port. Each Output Cell Buffer stores a single cell for transmission over the communications link.

At call setup, a plurality of tables are configured which are employed in the presently disclosed logical multicasting technique. A first table contains VPI/VCI addresses and a chaining bit in each record entry and is indexed by the local connection identifier. A second table contains the next offset value to be employed and is likewise indexed by the local connection identifier offset. A third table contains a number of entries for cell statistics and is also indexed by the local connection identifier offset.

Logical multicasting proceeds in the following manner. The outgoing VPI/VCI address to be employed in the first outgoing cell of a series of outgoing logical multicast cells is read from the first table using the local connection identifier (CID) in the internal cell header as an offset into the table. The VPI/VCI address from the indexed location is inserted into the cell header for the outgoing cell within the applicable Output Cell Buffer and the cell is transmitted out of the respective output port. The first table also includes a chaining bit for each indexed record. If the chaining bit is set, such indicates that the cell is to be logically multicast and a further leaf of the logical multicast cell exists for transmission. Thus, if the chaining bit is set, the cell is maintained within the respective Output Cell Buffer for the duration of the logical multicast sequence.

In the event a further cell is queued for transmission, a second cell is read from one of the queues in accordance with the specified scheduling algorithm and the cell is stored in a second one of the plurality of Output Cell Buffers. The local connection identifier within the internal cell header is employed as an index into the first table to locate the outgoing VPI/VCI address for the additional cell.

When a chaining bit is set in the respective record, an additional lookup is performed in the second table using the same index value as was employed to locate the VPI/VCI address for the prior cell in the logical multicast sequence. The lookup yields a new offset which replaces the local connection identifier within the internal cell header. The new offset is employed for the next VPI/VCI lookup in the logical multicast sequence. In the foregoing manner, a linked list or chain of offsets may be generated to locate the outgoing VPI/VCI addresses for the cells to be logically multicast from the respective port. The chain terminates when the chaining bit is not set, At this point, the respective Output Cell Buffer is available to receive another cell specified by the Scheduler.

Cells are transmitted from the plurality of Output Cell Buffers in a round robin sequence so long as cells are present for transmission in the respective buffers. In the event that a buffer is empty, the cell within the next Output Cell Buffer in the round robin sequence is transmitted from the respective output port. As a consequence of the toggling of transmit opportunities among the Output Cell Buffers containing a cell to transmit, cell delay variation is lowered for cells within the plurality of cell queues.

The logically multicast cells are received at a downstream network switch or node and are switched out the port at the downstream node associated with the VPI/VCI address specified within the respective cells. In the foregoing manner, even if the downstream node does not support spatial multicast, it will appear to be spatially multicasting cells by virtue of the logical multicasting operation performed at the upstream switch.

The presently disclosed logical multicasting technique reduces the possibility that a low priority logical multicast cell with many leaves will block a high priority cell, avoids the need to dedicate an input and output port to logical multicast support, and minimizes cell delay variation for cells within the cell queues.

BRIEF DESCRIPTION OF THE SEVERAL VIEWS OF THE DRAWING

The invention will be more fully understood by reference to the following Detailed Description of the Invention in conjunction with the drawing, of which.

DETAILED DESCRIPTION OF THE INVENTION

Figure 1:
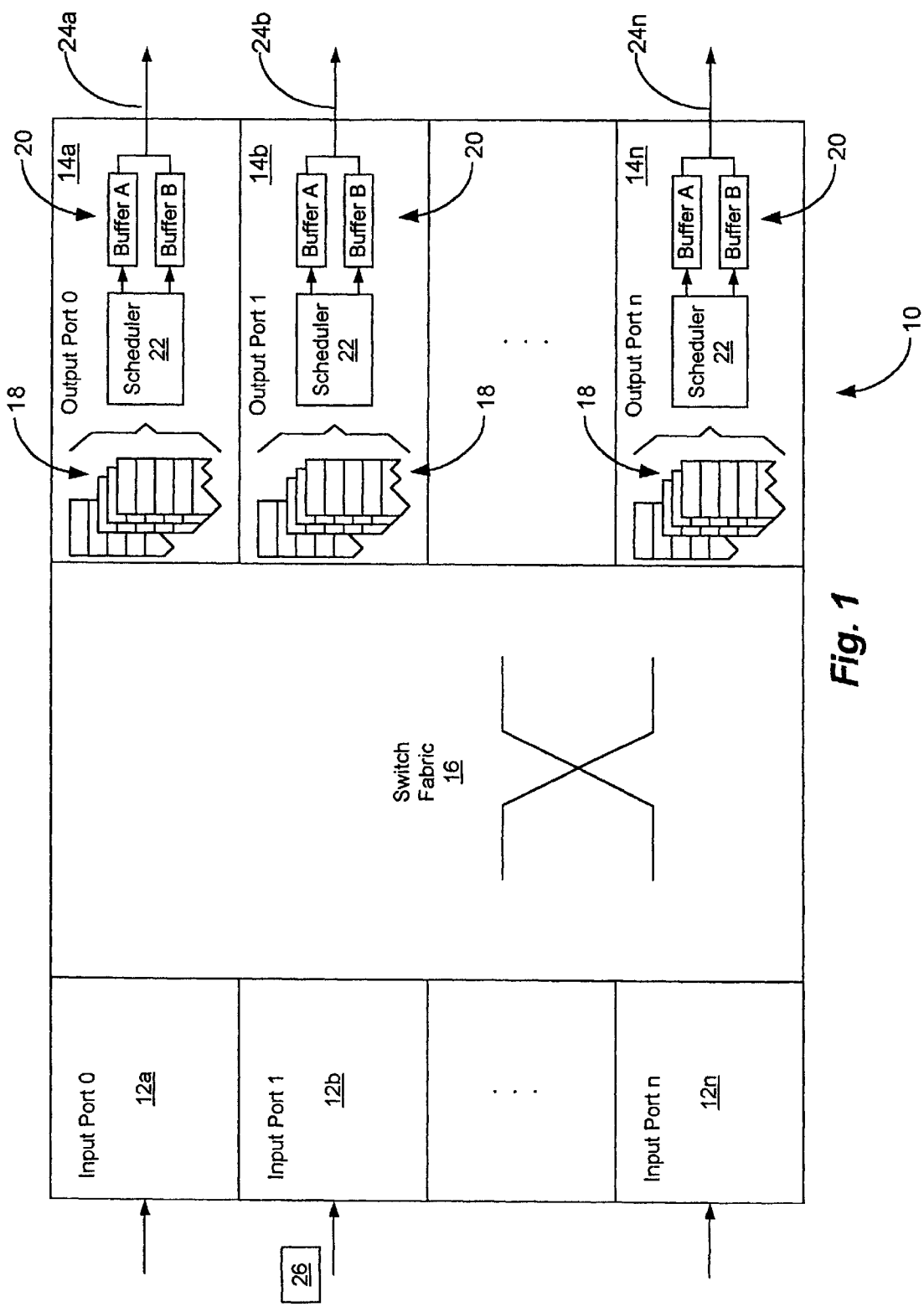
FIG. 1 is a block diagram of a network switch operative to perform logical multicasting in accordance with the present invention.

In accordance with the present invention, a method and apparatus are disclosed for logically multicasting cells from an Asynchronous Transfer Mode (ATM) switch to permit spatial multicast of cells in a downstream node which does not support spatial multicast. A network switch 10 operative in accordance with the present invention is depicted in FIG. 1 and includes a plurality of input ports 12 designated herein as input ports 12a through 12n, respectively, a plurality of output ports 14 designated herein as output ports 14a through 14n, respectively, and a switch fabric 16 for selectively forwarding cells received at one of the input ports 12 of the network switch 10 to one or more of the output ports 14 of the switch. Each output port 14a through 14n includes a plurality of output queues 18 for storing cells in advance of dispatch from the respective output port 14. Additionally, each output port 14a through 14n includes a plurality of Output Cell Buffers which are depicted as Buffer A and Buffer B in FIG. 1. While only two Output Cell Buffers 20 are illustrated, a greater number of Output Cell Buffers may be employed within each output port. A Scheduler 22 is operative to identify cells which are queued on the output queues and to select cells for dispatch to one of the Output Cell Buffers in accordance with techniques which are discussed subsequently in greater detail. Cells are transmitted from the Output Cell Buffers onto an associated communication link 24. The communications links are designated herein as links 24a through 24n.

Upon receipt of a cell 26 at input port 12b of the switch 10, VPI/VCI address of the received cell is employed within the input port in a lookup operation to identify a connection identifier which is used within the switch to specify the manner of cell processing. More specifically, if the received cell is a multicast cell, a table lookup is performed using the VPI/VCI address as an index to locate a multicast identifier (MID). The MID is stored within an internal cell header which is prepended to the received ATM cell. If the received cell 26 is a unicast cell a table lookup is performed using the VPI/V(CI address as an index to locate a connection identifier (CID) which is stored within the internal cell header.

The received cell in conjunction with the prepended cell header is switched via the switch fabric 16 to one or more of the output ports 14 of the switch 10 Upon receipt at the respective output port, a table lookup is performed using the MID or the CID, as applicable, as an index into a look-up table, to generate a local connection identifier. The local connection identifier is stored within the internal cell header in place of the MID or CID. The local connection identifier stored within the internal cell header is employed within the output port as an offset in various table lookup operations which are subsequently described in greater detail. The internal cell header and the associated cell are stored within one of the plurality of queues 18 within the respective output port 14 of the switch 10.

Figure 2:
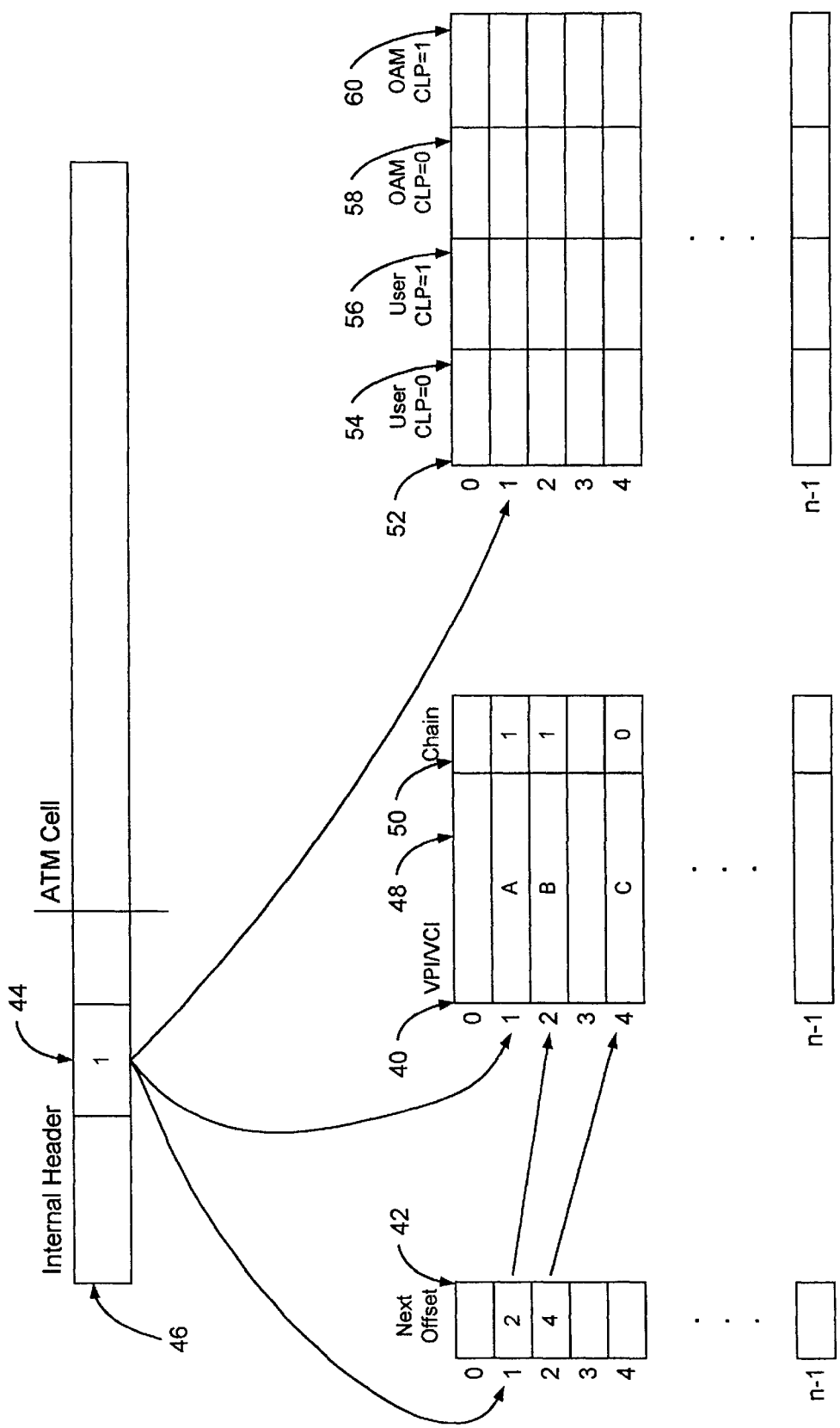
FIG. 2 illustrates exemplary data structures employed to perform logical multicasting in the network switch of FIG. 1.

Referring to FIG. 2, the data structures employed to achieve logical multicasting in accordance with the presently disclosed method are depicted. In a preferred embodiment, two tables associated with the output port are employed to accomplish logical multicasting; namely, a VPI/VCI lookup table 40 and a Next Offset Table 42. The VPI/VCI lookup table is indexed by the local connection identifier 44 within the internal cell header 46. The VPI/VCI lookup table includes a VPI/VCI field 48 which specifies the outgoing VPI/VCI address to be employed for the outgoing cell and a Chain Bit field 50 which is employed in the logical multicasting of cells. When the chain bit is set, an additional lookup is performed in the Next Offset table 42 using the same CID as was employed for the last lookup within the VPI/VCI lookup table 40 for the respective cell. The result of the lookup within the Next Offset table 42 is a new local connection identifier or offset which replaces the one carried within the internal cell header 46. The new offset is employed for the next lookup operation within the VPI/VCI lookup table 40. Thus, a linked list of offsets is provided which allows for a series of outgoing VPI/VCI addresses to be located within the lookup table 40 and inserted in the Output Cell Buffer 20 for transmission over the applicable communication link 24.

A statistics table 52 is also provided in which cell statistics may be stored. In a preferred embodiment, the statistics table 52 includes a first field 54 which contains a count of User cells having the Cell Loss Priority (CLP) bit=0, a second field 56 which contains a count of User cells having the CLP bit=1, a third field 58 which contains a count of Operation, Administration and Maintenance (OAM) cells having the CLP bit=0 and a fourth field 60 which contains a count of OAM cells having the CLP bit=1.

Figure 3:
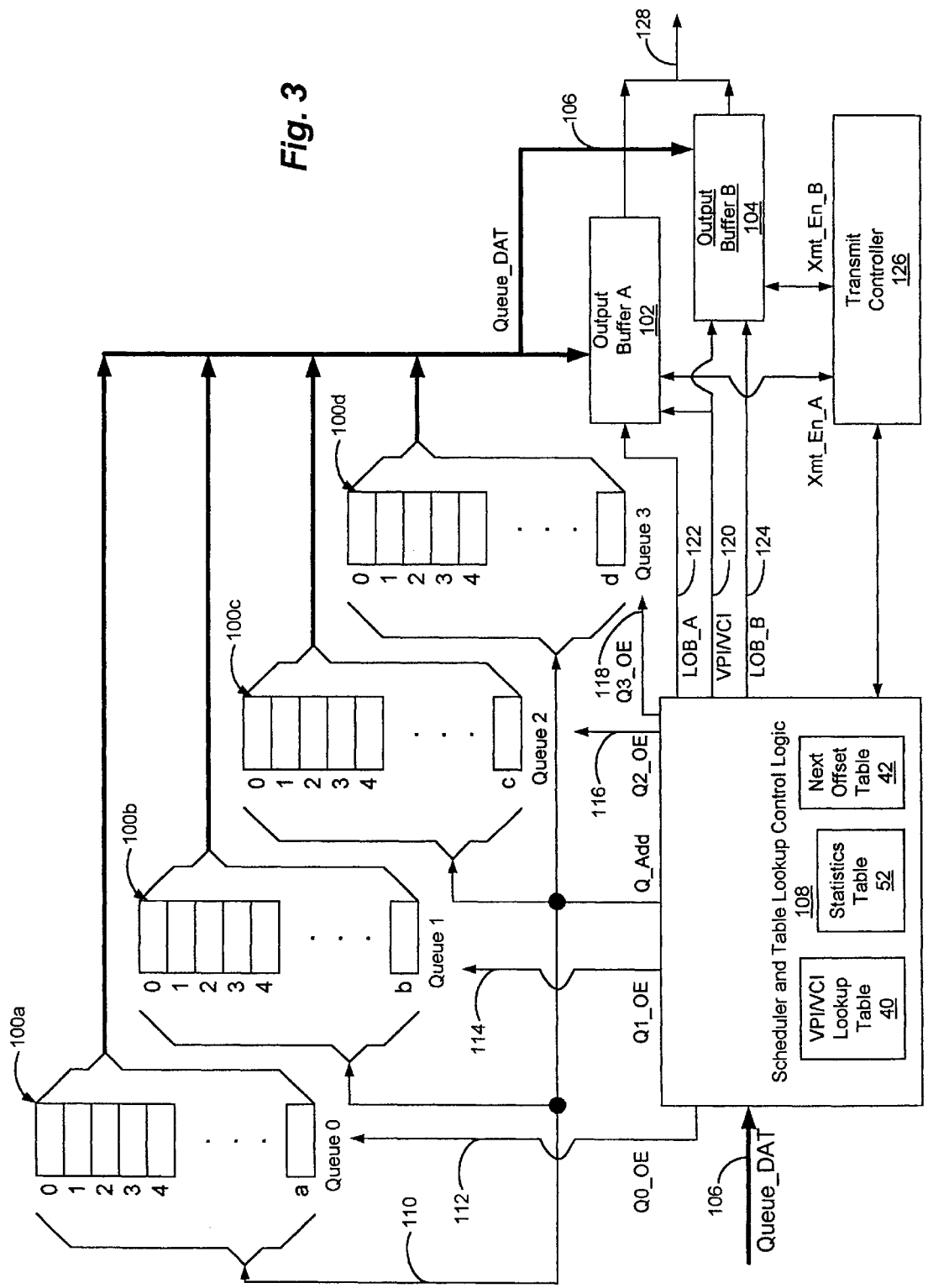
FIG. 3 is a more detailed block diagram of one of the output ports of the network switch of FIG. 1 employed to achieve logical multicasting of ATM cells.

FIG. 3 depicts in greater detail, the logic associated with each output port 14 employed to support logical multicast operation. It is noted that while the VPI/VCI lookup table, the Next Offset table and the Statistics Table are illustrated in FIG. 3, such tables may be shared across a plurality of ports which would typically be disposed on a single Input/Output Module in the network switch 10. As depicted in FIG. 3, a plurality of queues 100a through 100d are provided for storing ATM cells for dispatch from the output port. The various queues may correspond to various levels of priority or levels of service. For example, queue 100a may receive cells which are designated as having the highest priority, queue 100b may receive cells which are designated as having a priority lower than the cells stored in queue 100a, queue 100c may receive cells which are designated as having a priority lower than the cells stored in queue 100b and queue 100d may receive cells which are designated as having a priority lower than the cells stored in queue 100c. Accordingly, the cells stored within queue 100a comprise the highest priority cells and the cells stored within queue 100d comprise the lowest priority cells. ATM cells are switched to the respective output ports and stored within the queues in a conventional manner noting that an internal cell header containing an offset value is stored in the queue in conjunction with the respective cell. The outputs of the queues 100a through 100b are coupled to Output Cell Buffer A 102 and Output Cell Buffer B 104 via a bus (Queue_DAT) 106. Transfer of a cell from one of the queues to one of the Output Cell Buffers proceeds under the control of the Scheduler and Table Lookup Control Logic 106 in the manner described below.

The Scheduler employs a predetermined algorithm to select the next cell from one of the plurality of queues for dispatch to a free Output Cell Buffer 102 or 104. For example, the queues may be organized as First In First Out queues (FIFOs) and the Scheduler may employ strict priority scheduling in which the next cell dispatched to a free Output Cell Buffer always comprises the first cell in the highest priority queue. Using the strict priority scheduling algorithm, it should be appreciated that there is a possibility that ongoing service of the higher priority queues will preclude the lower priority queues from being serviced.

Alternatively, a weighted priority scheduling algorithm may be employed to assure that all queues, irrespective of priority, are serviced. In one example of a weighted queue, assuming all queues have cells to transmit, the Scheduler 108 would cause the queue 100b to forward a cell to a free output Cell Buffer 102 or 104 after two cells were forwarded from queue 100a. Additionally, the Scheduler 108 would cause the queue 100c to forward a cell to a free Output Cell Buffer 102 or 104 after two cells were forwarded from queue 10b and the Scheduler 108 would cause the queue 100d to forward a cell to a free Output Cell Buffer 102 or 104 after two cells were forwarded from queue 100c. It should be appreciated that the weightings employed within the Scheduler 108 may be varied for different applications and need not be equal. Applying a weighted priority scheduling algorithm allows the lower priority queues to obtain at least some of the scheduled bandwidth.

It should also be appreciated that any other suitable scheduling technique may be employed for dispatching cells from the plurality of queues to an available one of the plurality of Output Cell Buffers.

The Scheduler and Table Lookup Control Logic controls the Scheduling and dispatch of cells to an available Output Cell Buffer and ascertains the outgoing VPI/VCI address for each outgoing cell. The Scheduler 108 has an address output bus Q_Add 110 which is coupled to the address inputs of the plurality of queues 100a–100d. Additionally, the Scheduler 108 drives queue output enable lines Q0_OE 112, Q1_OE 114, Q2_OE 116 and Q3_OE 118 which are coupled to the respective queue FIFOs. Assertion of the applicable output enable line causes the internal cell header and the cell information to be driven from the addressed location within the respective queue onto the Queue_DAT bus 106. The Scheduler 108 also drives VPI/VCI address lines which are coupled to the Output Cell Buffers 102 and 104 and additionally drives Output Cell Buffer load signals LOB_A 122 and LOB_B 124 to cause the respective Output Cell Buffer to be loaded with data. The outputs of the Output Cell Buffers 102 and 104 are coupled to the communication link 128. A transmit controller 126 causes cells to be transmitted out of the Output Cell Buffers in an alternating or round robin sequence so long as cells are present in both buffers for transmission onto the communications link 128. Thus, if cells are present in both Output Buffers 102 and 104, the transmit controller toggles transmit opportunities between the respective Output Cell Buffers. If only one cell buffer has cells for transmission over the link, that cell buffer is afforded all transmit opportunities by the transmit controller until once again both cell buffers contain cells for transmission. If more than two Output Cell Buffers are employed, transmit opportunities are afforded to the Output Buffers having cells to transmit in a round robin sequence.

The Scheduler and Table Control Lookup logic 108 also has access to the VPI/VCI lookup table 40 the Next Offset table 412 and the Statistics table 52.

The VPI/VCI Lookup table 40 and the Next Offset Table 42 are configured when a connection is established or torn down and may be modified from time to time if, for example, a leaf of logical multicast transmission is pruned for any reason.

Such configurations are performed as switch 10 administrative functions. Since chaining of leaves is permitted within the VPI/VCI Lookup Table, contiguous memory locations are not. required. Accordingly, the management and updating of the VPI/VCI Lookup Table and the Next Offset table is simplified.

Logical multicast operation in accordance with the presently disclosed technique will be more fully understood by reference to the illustrative example described below and with reference to FIGS. 1–3. Assume a cell 26 is received at an 10 input port 12b of the switch 10 and the switch 10 has been configured to logically multicast the cell out a single output port because the downstream switch coupled to that port does not support spatial multicast. The VPI/VCI address of the cell 26 is used as an index into a lookup table within the input port 12b in a conventional manner to obtain a multicast connection identifier (MID) which is inserted within an internal cell header. The internal cell header is prepended to the cell and the cell, along with the the internal cell header is switched through the switch fabric 16 for receipt by the applicable output port. Upon receipt at the output port, the multicast connection identifier within the internal cell header is used as an index into a lookup table to obtain a local connection identifier which is stored within the internal cell header. The cell 26 along with the prepended cell header is then stored on one of the plurality of queues 100a–100d based upon the priority of the cell. While, in the present embodiment, cells are queued based upon cell priority, any other queuing criteria may be employed without departing from the inventive concepts disclosed herein. Additionally, the logical multicast functionality herein disclosed are located after any spatial multicast mechanisms (not shown) if such are employed in the switch. In this manner the switch 10 may perform any mix of spatial and logic multicast operations.

When the Scheduler 108 determines that the cell 26, which comprises the logical multicast cell is the next cell for dispatch, based upon the scheduling algorithm employed, and an Output Cell Buffer is free, the cell 26 within the respective queue in addressed by the scheduler 108 over Q_Add lines 110 and the queue output is enabled to drive the Queue_DAT data bus 106. The Scheduler reads the local connection identifier 44 information from the internal cell header to obtain an offset into the VPI/VCI Lookup Table 40. In the present example, referring to FIG. 2, the offset 1 as used as an index into the Lookup Table 40 to obtain the outgoing VPI/VCI address A for the cell 26. Assuming that Output Cell Buffer A 102 is available, the Scheduler 108 asserts the load output buffer A. signal LOB_A to cause the cell to be loaded into Output Cell Buffer A with the proper outgoing VPI/VCI address. Applicable cell statistics are written to the Statistics table 52 at the same offset. The Chain bit 50 at the offset 1 is next tested to determine whether such bit is set. If the chain bit 50 is set, such indicates that the cell is a logical multicast cell with additional leaves that need to be transmitted and the cell is retained in the applicable Output Cell Buffer for the remainder of the logical multicast sequence. Since the chain bit 50 is set in the record entry within the VPI/VCI Lookup Table corresponding to offset entry 1, the cell 26 is kept in Output Cell Buffer A. If the Chain bit is set, the Table Lookup Control Logic performs a further look-up within the Next Offset Table 42 using the current offset value as the index. Using the current offset value of "1" as an index into the Next Offset Table 42, the next offset of "2" is obtained. This offset value is then employed as an index into the VPI/VCI Lookup Table 40 to obtain the next outgoing VPI/VCI address within the logical multicast sequence. In the present example, the VPI/VCI address B is retrieved from the VPI/VCI Lookup Table 40, and the VPI/VCI address B is loaded into the Output Cell Buffer 102 for transmission after the transmission of the cell bearing the VPI/VCI address A. The payload for the cell remains the same. Applicable cell statistics are written to the Statistics table 52 at the same offset. The Chain bit 50 at offset 2 within the VPI/VCI Lookup Table is tested and, in the present example, it is determined that the chain bit is set indicating that a further leaf exists for transmission.

Accordingly, the offset 2 is employed as an index into the Next Offset Table 42 to identify the offset to be employed in the next VPI/VCI lookup. In the present example, using the offsets 2 as the index into the Next Offset Table, the offset 4 is retrieved. This offset is employed as the index into the VPI/VCI Lookup Table 40 to identify the outgoing VPI/VCI address C for the next cell to be transmitted in the logical multicast sequence of cells. After the transmission of the leaf bearing the VPI/VCI address B, the VPI/VCI address C is loaded into the Output Cell Buffer 102 for transmission out of the respective output port. Applicable cell statistics are written to the Statistics table 52 at the same offset. The Chain Bit 50 at offset 4 is next tested and it is determined that the chain bit 50 at such offset is not set. Since the Chain bit 50 is not set, the Output Cell Buffer 102 is freed after transmission of the cell bearing the VPI/VCI address C which comprises the last leaf in the logical multicast sequence. Once the Output Cell Buffer is freed, another cell may be dispatched from the Scheduler to that Output Cell Buffer.

It should be noted that the number of leaves that can be supported per circuit for logical multicast is equal to the number of connections supported within the switch. In a preferred embodiment of the switch, sixteen thousand connections may be accommodated at any given time.

It should further be noted that cells within the queue may comprise logical multicast or unicast cells. Unicast cells are handled as a degenerate case of the logical multicast case in which the first test of the Chain bit 50 within the VPI/VCI Lookup Table 40 results in a determination that the chain bit is not set. In such event, the Output Cell Buffer for the respective unicast cell is freed after the transmission of the single unicast cell from the Output Cell Buffer.

The utilization of multiple output buffers which are provided transmit opportunities in a round robin sequence provides significant performance advantages in a network switch supporting logical multicast operation. It will be appreciated that a low priority logical multicast cell having numerous leaves may be dispatched to the Output Cell Buffer. If a single Output Cell Buffer is provided, all cells, including higher priority cells would be blocked pending completion of the logical multicast operation. Blocking introduces undesirable cell delay variations. The provision of a plurality of Output Cell Buffers which are afforded transmit opportunities in a round robin sequence allows logical multicast operation to be provided in a non-blocking manner and minimizes the introduction of such undesirable cell delay variations.

The methods employed in accordance with the present invention are further illustrated by reference to the flow charts of FIGS. 4a and 4b.

Figure 4B:
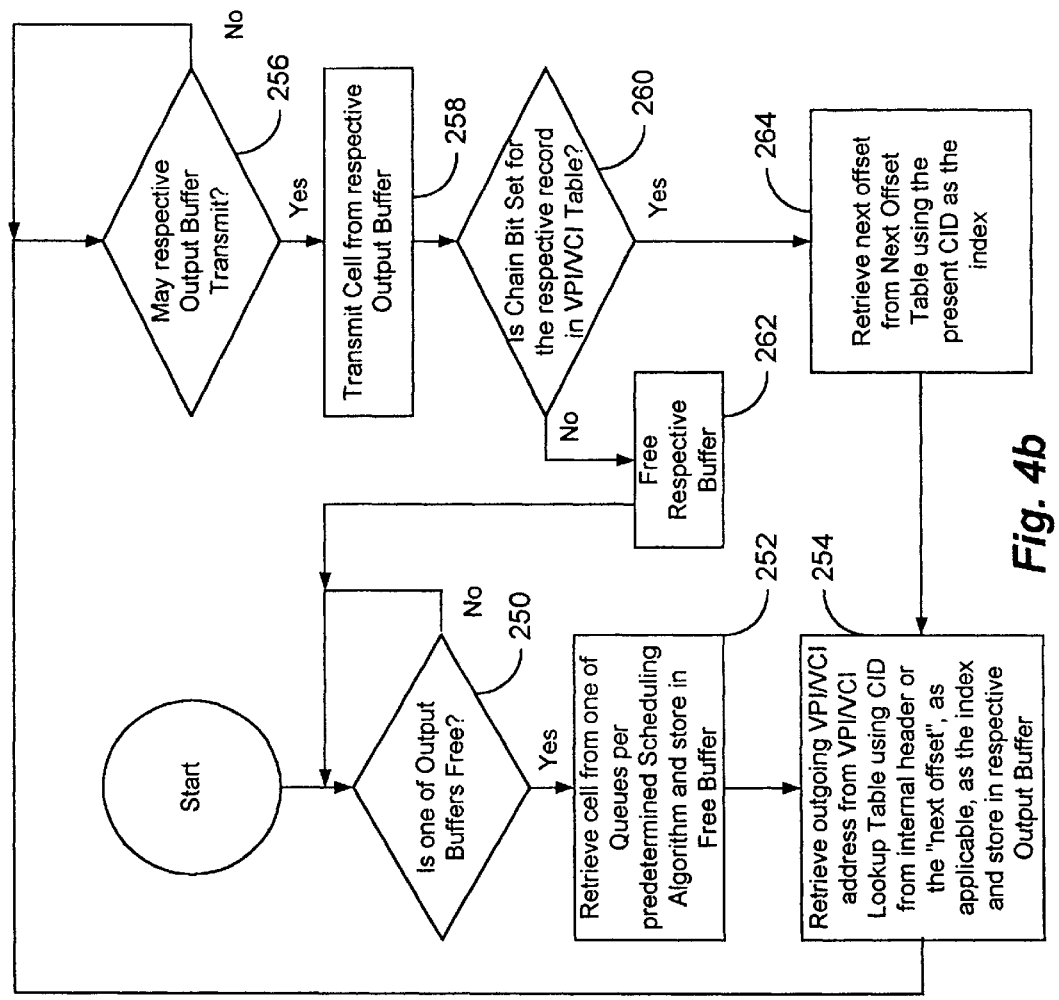
FIG. 4b is a flow diagram depicting the method of performing logical multicasting in accordance with the present invention.
Figure 4A:
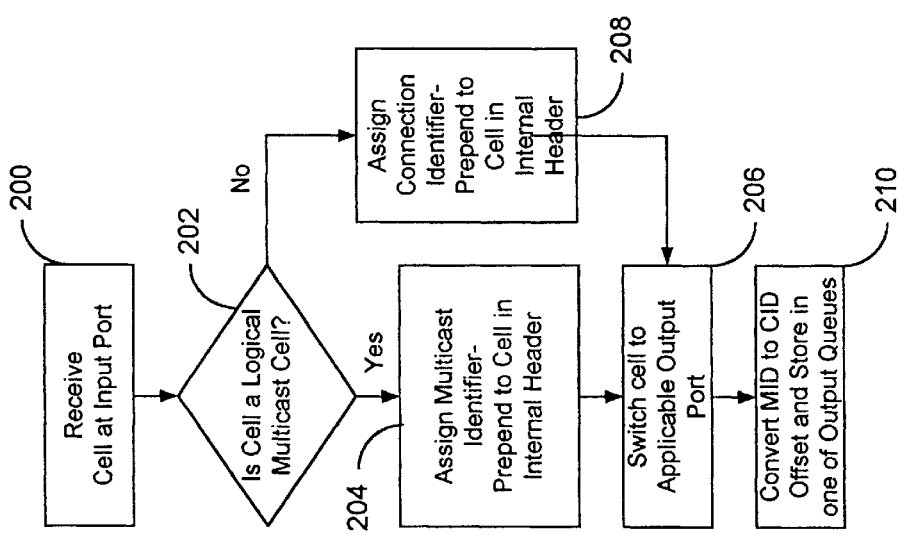
FIG. 4a is a flow diagram depicting the method of storing cells in output queues within the output ports of the network switch of FIG. 1.

FIG. 4a depicts the process by which cells are received, switched to the applicable output port and queued for dispatch to an Output Cell Buffer. Referring to FIG. 4a, a cell is received at an input port of the switch as depicted in step 200. Following receipt of the cell, a determination is made whether the cell is a logical multicast cell or a unicast cell as depicted in decision step 202. If the cell is a logical multicast cell, a Multicast Connection identifier (MID) is assigned to the cell based upon the incoming VPI/VCI address and the MID is prepended to the cell in an internal cell header as illustrated in step 204. The cell is then switched to the applicable output port as shown in step 206. The cell may be switched to plural output ports if the cell is a spatial multicast cell. If it is determined in step 202 that the cell is not a multicast cell, but rather a unicast cell, a Unicast Connection Identifier (CID) is assigned based upon the incoming VPI/VCI address and is the CID prepended to the cell within an internal cell header as depicted in step 208. The unicast cell along with the cell header is next switched to the applicable output port as depicted in step 206. The multicast identifier (MID) or the (CID) is next converted to a local connection identifier at the I/O module containing the respective output port and the local connection identifier is stored within the internal cell header. The cell along with the prepended cell header is stored within the appropriate queue for the respective output port as illustrated in step 210. Dequeuing of cells proceeds as illustrated in FIG. 4*b*.

Referring to FIG. 4*b* the Output Cell Buffers are tested to determine whether one of the plurality of cell buffers is force as illustrated in decision step 250. If none of the Output Cell Buffers are free, the Scheduler defers until one of the buffers is free. If it is determined by the Scheduler that cone of the cell buffers is available to receive a cell, the Scheduler retrieves a cell from one of the queues in accordance with a predetermined scheduling algorithm and stores the selected cell within the available Output Cell Buffer as depicted in step 252, The outgoing VPI/VCI for the respective cell is next retrieved from a lookup table using the local connection identifier within the internal cell header for the respective cell as an index. The retrieved VPI/VCI address is stored in the applicable Output Cell Buffer as shown in step 254. As previously discussed, Output Cell Buffers are afforded transmit opportunities in a round robin sequence. Thus, as illustrated in inquiry step 256, a determination is made whether the respective Output Cell Buffer may transmit its cell out of the output port onto the communication link. If the respective Output Cell Buffer cannot transmit, it defers until afforded a transmit opportunity by the transit controller 126. When afforded a transmit opportunity, the cell is transmitted from the Output Cell Buffer onto the associated communications link as depicted in step 258. The chain bit at the offset specified by the local connection identifier is next tested as illustrated in decision step 260 to determine whether the cell comprises a logical multicast cell having further outgoing leaves. If inquiry step 260 results in a determination that the chain bit is not set, the respective Output Cell Buffer is freed and made available to receive another cell following the transmission of the current cell within the buffer as depicted in step 262 and flow passes to inquiry step 250. If the chain bit is set, indicating that the cell comprises a logical multicast cell with a further leaf for transmission, the cell payload remains within the applicable Output Cell Buffer and the present local connection identifier is employed as an index into the Next Offset Table to retrieve a new local connection identifier to be employed for further look-ups as shown in step 264. The new connection identifier is then employed as an index into the VPI/VCI Lookup Table to retrieve the VPI/VCI address for the next outgoing leaf in the logical multicast sequence. Flow proceeds to inquiry step 256 and the process continues.

It should be appreciated that the cells dispatched to the Output Cell Buffers may comprise logical multicast or unicast cells and thus, at any given time either type of cell may be resident in either Output Cell Buffer. Thus, look-ups of outgoing VPI/VCI addresses for the cells contained within the Output Cell Buffers may be interleaved.

While the embodiment depicted in FIG. 3 includes four FIFO queues 100*a*–100*d*, it should be appreciated that any number of queues may be employed and any suitable scheduling technique may be used for dispatching cells from the respective queues to the free Output Cell Buffers. For example, one queue may be provided for each connection being serviced within the switch 10. Additionally, while two Output Cell Buffers are employed in the embodiment depicted in FIGS. 1 and 3, a greater number of Output Cell Buffers may be employed to further minimize the possibility of blocking and further reduce cell delay variations that may be introduced as a consequence of logical multicast support. Transmit opportunities are granted to the Output Cell Buffers by the Transmit Controller in a round robin sequence.

In the above described embodiments, the VPI/VCI lookup table and the Next Offset table are described as two separate tables. It should be appreciated that such tables may comprise a single table indexed by the local connection identifier.

The above described embodiments are intended to be exemplary. It will be appreciated that variations to and modification of the above described methods and apparatus for performing logical multicasting of cells from a network switch are possible and will be apparent to those of ordinary skill in the art without departing from the presently disclosed inventive concepts. Accordingly, the invention is not to be viewed as limited to the exemplary embodiments but rather, solely by the scope and spirit of the appended claims.

What is claimed is:

1. A method for performing logical multicasting of a cell having a predetermined number of leaves from an output port of a network device comprising the steps of:

pre-appending an internal cell header containing a multicast identifier in said cell;

in a first storing step, storing said logical multicast cell in a first output cell buffer of a plurality of output cell buffers associated with said output port, wherein each one of said plurality of output cell buffers is in electrical communication with a single communications link;

in a first transmitting step, transmitting in a predetermined sequence a predetermined number of leaf cells corresponding to said leaves of said logical multicast cell onto said communications link from said first output cell buffer, said leaf cells including a last leaf cell corresponding to a last leaf of said leaves;

in a second storing step, storing at least one other cell in a second output cell buffer of said plurality of output cell buffers; and in a second transmitting step, transmitting said at least one other cell over said communications link from said second output cell buffer between two of said leaf cells transmitted from said first output cell buffer in said predetermined sequence.

2. The method of claim 1 further comprising the step of providing an indication that the respective output cell buffer of said plurality of output cell buffers is available for receipt of an additional cell following the transmission of one of a unicast cell and the last leaf cell of said logical multicast cell from the respective output cell buffer.

3. The method of claim 2 further comprising the step of:

prior to said first transmitting step, storing said logical multicast cell in one of a plurality of output queues associated with said output port according to a predetermined storage criteria and forwarding said logical multicast cell to said first output call buffer from the respective output queue in accordance with a predetermined scheduling methodology when the respective output cell buffer is identified as being available to receive a cell.

4. The method of claim 3 wherein said predetermined scheduling methodology comprises the steps of:

associating priorities with each of the plurality of output queues; and dispatching cells from the respective output queues to selected ones of said plurality of output cell buffers based upon a strict priority methodology.

5. The method of claim 3 wherein said predetermined scheduling methodology comprises the steps of:

associating priorities with each of the plurality of output queues; and dispatching cells from the respective output queues to selected ones of said plurality of output cell buffers based upon a weighted priority methodology.

6. A method for performing logical multicasting of a cell having a predetermined number of leaves from an output port of a network device comprising the steps of:

in a first storing step storing said logical multicast cell in a first output cell buffer of a plurality of output cell buffers associated with said output port, wherein each one of said plurality of output cell buffers is in electrical communication with a single communications link;

storing said logical multicast cell in one of a plurality of output queues associated with said output port according to a predetermined storage criteria and forwarding said logical multicast cell to said first output cell buffer from the respective output queue in accordance with a predetermined scheduling methodology when the respective output cell buffer is identified as being available to receive a cell;

storing an offset value within the respective queue in association with said logical multicast cell;

performing an address lookup operation utilizing said offset value as an index to locate an address to be transmitted with a corresponding leaf cell of said logical multicast cell and storing said address within said first output cell buffer;

performing a chaining information lookup operation utilizing said offset value as an index to locate chaining information associated with said offset value, said chaining information comprising an indication of whether any further leaf cells are to be transmitted from the respective output cell buffer;

testing said chaining information to determine whether said chaining information indicates that a further leaf cell is to be transmitted from the respective output cell buffer;

in the event said chaining information indicates that a further leaf cell remains to be transmitted, performing a next offset value lookup operation utilizing said offset value as an index to locate a new offset value and repeating said performing steps and said testing step using said new offset value as said offset value; or in the event said chaining information does not indicate that a further leaf cell remains to be transmitted, identifying said first output cell buffer as available to receive another cell following the transmission of said last leaf cell;

in a first transmitting step, transmitting in a predetermined sequence a predetermined number of leaf cells corresponding to said leaves of said logical multicast cell onto said communications link from said first output cell buffer, said leaf cells including a last leaf cell corresponding to a last leaf of said leaves;

in a second storing step, storing at least one other cell in a second output cell buffer of said plurality of output cell buffers;

in a second transmitting step, transmitting said at least one other cell over said communications link from said second output cell buffer between two of said leaf cells transmitted from said first output cell buffer in said predetermined requence; and providing an indication that the respective output cell buffer of said plurality of output cell buffers is available for receipt of an additional cell following the transmission of one of a unicast cell and the last leaf cell of said logical multicast cell from the respective output cell buffer.

7. The method of claim 6 further comprising the step of storing statistics information in at least one statistic table indexed by said offset value.

8. The method of claim 6 wherein said address comprises a Virtual Path Identifier/Virtual Connection Identifier address for transmission with the corresponding leaf cell of said logical multicast cell.

9. The method of claim 1 wherein said second transmitting step further comprises the step of transmitting additional cells from each output cell buffer storing said additional cells for transmission, in addition to said logical multicast cell stored in said first output cell buffer and said at least one other cell stored in said second output cell buffer, in a predetermined transmission sequence so as to interpose the transmission of said additional cells between the transmission of said leaf cells of said multicast cell from said first output cell buffer.

10. The method of claim 9 wherein said predetermined transmission sequence comprises a round robin sequence.

11. Apparatus for logical multicasting of a cell having a predetermined number of leaves from an output port in a network device comprising:

a decoder for interpreting a pre-appended internal cell header to classify a cell as a logical multicast cell or a unicast cell;

a plurality of output cell buffers associated with said output port, each one of said plurality of output cell buffers being coupled to a single communication link associated with said output port, a first of said plurality of output cell buffers for storing said logical multicast cell and a second of said plurality of output cell buffers for storing said unicast cell;

a cell transmission controller in electrical communication with each of said plurality of output cell buffers, said controller operative to control the transmission of a predetermined number of leaf cells corresponding to said leaves of said logical multicast cell in a predetermined sequence from said first output cell buffer and said unicast cell from said second output cell buffer;

said cell transmission controller being operative to cause said transmission of said unicast cell between transmissions of two of said leaf cells in said predetermined transmission sequence.

12. The apparatus of claim 11 wherein said predetermined sequence comprises a round robin sequence among said plurality of output cell buffers.

13. The apparatus of claim 12 wherein said predetermined sequence comprises a round robin sequence among said plurality of output cell buffers containing cells available for transmission.

14. The apparatus of claim 11 further comprising:

a plurality of output queues, each one of said plurality of output queues for storing cells received by said computer network device and an offset value associated with the respective cell, wherein said received cells comprise said logical multicast cells and said unicast cells;

a scheduler operative to selectively forward said cells from said queues to selected ones of said output cell buffers upon selection of the respective cell for dispatch by said scheduler and upon an indication that the respective cell buffer is available to receive the respective cell.

15. Apparatus for logical multicasting of a cell having a predetermined number of leaves from an output port in a network device comprising:

a plurality of output cell buffers associated with said output port, each one of said plurality of output cell buffers being coupled to a single communication link associated with said output port, a first of said plurality of output cell buffers for storing said logical multicast cell and a second of said plurality of output cell buffers for storing a unicast cell;

a cell transmission controller in electrical communication with each of said plurality of output cell buffers, said controller operative to control the transmission of a predetermined number of leaf cells corresponding to said leaves of said logical multicast cell in a predetermined sequence from said first output cell buffer and said unicast cell from said second output cell buffer;

said cell transmission controller being operative to cause said transmission of said unicast cell between transmissions of two of said leaf cells in said predetermined transmission sequence;

a plurality of output queues, each one of said plurality of output queues for storing cells received by said computer network device and an offset value associated with the respective cell, wherein said received cells comprise said logical multicast cells and said unicast cells;

a scheduler operative to selectively forward said cells from said queues to selected ones of said output cell buffers upon selection of the respective cell for dispatch by said scheduler and upon an indication that the respective cell buffer is available to receive the respective cell;

at least one lookup table indexed by said offset value, said at least one lookup table containing an address field containing an address, a chaining field containing an indication of whether the address within the address field at the corresponding offset value corresponds to the last address associated with the last leaf cell of a multicast cell and a next offset value field containing an indication of the next offset value to be employed in the event the contents of said chaining field indicate another leaf cell is to be transmitted; and a multicast controller operative to iteratively:

access an address contained within said address field in response to said offset value and to store said address within the respective output cell buffer containing the respective leaf cell in advance of the transmission of that leaf cell over the associated communication link;

test the contents of the chaining field indexed by the respective offset value to determine if any further leaf cells remain to be transmitted; and access the next offset value to be employed as said offset value in the next subsequent lookup operation employing said at least one lookup table in the event the testing of said chaining field indicates that a further leaf cell remains to be transmitted.

16. The apparatus of claim 15 wherein said at least one lookup table further comprises at least one field indexed by said offset value for storing statistics information.

17. The apparatus of claim 15 wherein said address comprises a virtual path identifier/virtual connection identifier address address.

18. The apparatus of claim 14 wherein each of said plurality of output queues has an associated priority and said scheduler is operative to selectively forward a cell from a selected one of the plurality of queues to a selected one of said output cell buffers applying a strict priority scheduling technique.

19. The apparatus of claim 14 wherein each of said plurality of output queues has an associated priority and said scheduler is operative to selectively forward a cell from a selected one of the plurality of queues to a selected one of said output cell buffers applying a weighted priority scheduling methodology in which cells are forwarded from at least one of said plurality of output queues more frequently than from at least one other one of said plurality of output queues.

* * * * *